US00RE48247E

(19) United States
(12) Reissued Patent
Boys et al.

(10) Patent Number: US RE48,247 E
(45) Date of Reissued Patent: Oct. 6, 2020

(54) PICK-UP APPARATUS FOR INDUCTIVE POWER TRANSFER SYSTEMS

(71) Applicant: Auckland Uniservices Limited, Auckland (NZ)

(72) Inventors: John Talbot Boys, Auckland (NZ); Grant Anthony Covic, Auckland (NZ); Grant Arthur John Elliot, Hong Kong (HK)

(73) Assignee: AUCKLAND UNISERVICES LIMITED, Auckland (NZ)

(21) Appl. No.: 13/930,505

(22) Filed: Jun. 28, 2013

Related U.S. Patent Documents

Reissue of:
(64) Patent No.: 7,969,269
Issued: Jun. 28, 2011
Appl. No.: 12/226,956
PCT Filed: May 2, 2007
PCT No.: PCT/NZ2007/000097
§ 371 (c)(1),
(2) Date: May 22, 2009
PCT Pub. No.: WO2007/126321
PCT Pub. Date: Nov. 8, 2007

(30) Foreign Application Priority Data

May 2, 2006 (NZ) ..... 546955

(51) Int. Cl.
*H01F 27/28* (2006.01)
*H02J 50/12* (2016.01)
(Continued)

(52) U.S. Cl.
CPC ..... *H02J 50/12* (2016.02); *B60L 53/12* (2019.02); *H01F 38/14* (2013.01); *H02J 50/10* (2016.02);
(Continued)

(58) Field of Classification Search
CPC ..... B60L 5/005; H02J 5/005; H01F 38/14
(Continued)

(56) References Cited

U.S. PATENT DOCUMENTS 3,990,030 A 11/1976 Chamberlin
4,665,369 A * 5/1987 Faller ..... G05D 1/0055 180/168
(Continued)

FOREIGN PATENT DOCUMENTS

DE 19926799 A1 * 12/2000 ..... H02J 17/00
NZ 329195 12/1998
(Continued)

OTHER PUBLICATIONS

"U.S. Appl. No. 12/226,956, Non Final Office Action dated Jul. 23, 2010", 7 pgs.
(Continued)

*Primary Examiner* — Kenneth Whittington
(74) *Attorney, Agent, or Firm* — Pilloff Passino & Cosenza LLP; Martin J. Cosenza

(57) ABSTRACT

An Inductive Power Transfer (IPT) pick-up apparatus includes a magnetically permeable core, a first coil, being wound about the core so as to be inductive coupled therewith such that a current induced in the first coil is most sensitive to a first directional component of magnetic flux and a second coil, being wound about the core so as to be inductively coupled therewith such that a current induced in the second coil is most sensitive to a second directional component of magnetic flux. The first directional component is substantially orthogonal to the second directional component.

27 Claims, 2 Drawing Sheets

(51) Int. Cl.

| | |
|---|---|
| ***H02J 50/90*** | (2016.01) |
| ***H02J 50/10*** | (2016.01) |
| ***B60L 53/12*** | (2019.01) |
| ***H01F 38/14*** | (2006.01) |
| *H01F 3/00* | (2006.01) |

(52) U.S. Cl.
CPC ..... *H02J 50/90* (2016.02); *H01F 2003/005* (2013.01); *Y02T 10/7005* (2013.01); *Y02T 10/7072* (2013.01); *Y02T 90/122* (2013.01); *Y02T 90/14* (2013.01)

(58) Field of Classification Search
USPC ..... 191/10, 14; 307/10.1, 104; 336/180, 336/181, 182, 185; 324/247
See application file for complete search history.

(56) References Cited

U.S. PATENT DOCUMENTS

| | | | | |
|---|---|---|---|---|
| 5,293,308 | A | 3/1994 | Boys et al. | H02J 5/005 363/37 |
| 5,426,409 | A * | 6/1995 | Johnson | 336/178 |
| 5,469,036 | A | 11/1995 | Eto | |
| 5,524,723 | A * | 6/1996 | Gramling | G05D 1/0265 104/286 |
| 5,528,113 | A * | 6/1996 | Boys et al. | B60L 53/32 318/16 |
| 5,821,638 | A * | 10/1998 | Boys et al. | 307/104 |
| 5,831,841 | A * | 11/1998 | Nishino | H01F 38/14 363/37 |
| 6,089,362 | A * | 7/2000 | Takasan et al. | 191/10 |
| 6,317,338 | B1 | 11/2001 | Boys | |
| 6,456,069 | B1 | 9/2002 | Scarzello et al. | |
| 6,483,202 | B1 * | 11/2002 | Boys | 307/17 |
| 6,489,771 | B1 | 12/2002 | Farque | |
| 6,499,701 | B1 * | 12/2002 | Thornton | B60L 5/005 246/1 C |
| 6,978,873 | B2 * | 12/2005 | Ishioka | B60L 5/005 191/10 |
| 7,969,269 | B2 | 6/2011 | Boys et al. | |
| 2003/0062980 | A1 * | 4/2003 | Scheible et al. | 336/170 |

FOREIGN PATENT DOCUMENTS

| | | | |
|---|---|---|---|
| NZ | 329195 | A | 7/2000 |
| WO | WO-9511545 | A1 | 4/1995 |
| WO | WO2004105207 | | 12/2004 |
| WO | WO-2004105207 | A1 | 12/2004 |
| WO | WO2005124962 | | 12/2005 |
| WO | WO-2005124962 | A1 | 12/2005 |
| WO | WO-03096361 | A1 | 11/2013 |

OTHER PUBLICATIONS

"U.S. Appl. No. 12/226,956, Notice of Allowance dated Jan. 25, 2011", 6 pgs.
"U.S. Appl. No. 12/226,956, Notice of Allowance dated May 11, 2011", 7 pgs.
"U.S. Appl. No. 12/226,956, Response filed Nov. 29, 2010 to Non Final Office Action dated Jul. 23, 2010", 9 pgs.
"U.S. Appl. No. 14/529,939 Non-Final Office Action Response, dated Sep. 4, 2011", 10 pgs.
"U.S. Appl. No. 14/529,939, Non Final Office Action dated Mar. 11, 2015", 19 pgs.
"U.S. Appl. No. 14/529,939, Response filed Sep. 4, 2015 to Non Final Office Action dated Mar. 11, 2015", 10 pgs.
"U.S. Appl. No. 14/529,939, Response filed May 16, 2016 to Non Final Office Action dated Jan. 15, 2016", 13 pgs.
"European Application Serial No. 07793941.1, Extended European Search Report Mar. 3, 2016", 9 pgs.
"U.S. Appl. No. 14/529,939, Final Office Action dated Oct. 1, 2015", 19 pgs.
"U.S. Appl. No. 14/529,939, Non Final Office Action dated Jan. 15, 2016", 22 pgs.
"U.S. Appl. No. 14/529,939, Preliminary Amendment dated Oct. 31, 2014", 7 pgs.
"U.S. Appl. No. 14/529,939, Response filed Dec. 31, 2015 to Final Office Action dated Oct. 1, 2015", 11 pgs.
U.S. Appl. No. 14/529,939, Amendment and Response to Final Office Action dated Dec. 27, 2016, 10 pgs.
U.S. Appl. No. 14/529,939, Final Office Action dated Jun. 27, 2016, 29 pgs.
U.S. Appl. No. 14/529,939, Non Final Office Action dated Feb. 3, 2017, 31 pgs.
U.S. Appl. No. 14/529,939, Final Office Action dated Sep. 26, 2017, 16 pgs.
U.S. Appl. No. 14/529,939, Response filed Aug. 3, 2017 to Non Final Office Action dated Feb. 3, 2017, 12 pgs.
U.S. Appl. No. 14/529,939, Non Final Office Action dated May 1, 2018, 10 pgs.
U.S. Appl. No. 14/529,939, Response filed Mar. 26, 2018 to Final Office Action dated Sep. 26, 2017, 9 pgs.
U.S. Appl. No. 14/529,939, Ex Parte Quayle Action dated Nov. 21, 2018, 9 pgs.
U.S. Appl. No. 14/529,939, Notice of Allowance dated Apr. 10, 2019, 5 pgs.
U.S. Appl. No. 14/529,939, Response filed Feb. 21, 2019 to Ex Parte Quayle Action dated Nov. 21, 2018, 14 pgs.
U.S. Appl. No. 14/529,939, Response filed Nov. 1, 2018 to Non Final Office Action dated May 1, 2018, 8 pgs.

* cited by examiner

PICK-UP APPARATUS FOR INDUCTIVE POWER TRANSFER SYSTEMS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*More than one reissue application has been filed for the reissue of U.S. Pat. No. 7,969,269. The other reissue application is U.S. application Ser. No. 14/529,939, filed Oct. 31, 2014, which is a reissue divisional of this reissue application. This reissue application is an application for reissue of U.S. Pat. No. 7,969,269, which is incorporated by reference in its entirety. U.S. Pat. No. 7,969,269 claims the benefit of priority under 35 U.S.C. § 119 to New Zealand Patent Application No. 546955, filed May 2, 2006.*

FIELD

This invention relates to a power pick-up apparatus for use in an Inductive Power Transfer (IPT) system.

BACKGROUND

In existing Inductive Power Transfer (IPT) applications using a flat pick-up on a floor or roadway, there are two pick-up geometries in common use.

The first arrangement is used with Automated Guided Vehicles (AGV's), and is sensitive to the vertical component of the magnetic flux produced by the currents in the primary conductors (commonly known as the track conductors). Ideally it sits directly above the track conductors, giving the maximum output when the pick-up coil is perfectly aligned between the track conductors. Any misalignment of the pick-up reduces the output from the pick-up coil, which falls to zero at a misalignment of roughly half of the distance between the track conductors.

The second arrangement is sensitive to the horizontal component of the flux produced by the current in the track, and gives the maximum output when the coil is directly over either one of the track conductors. The output falls to zero when the coil is approximately mid-way between the conductors.

When the IPT application is a moving vehicle, neither of these pick-up geometries is ideal as relatively small alignment errors cause the output to fall so that power to the vehicle is lost.

OBJECT

It is an object of the invention to provide an improved IPT pick-up apparatus which is less susceptible to alignment errors, or at least to provide the public with a useful choice.

SUMMARY OF INVENTION

Accordingly in one aspect the invention may broadly be said to consist in Inductive Power Transfer (IPT) pick-up apparatus including:

a magnetically permeable core;

a first coil, being disposed about the core such that it is most sensitive to a first directional component of magnetic flux;

a second coil, being disposed about the core such that it is most sensitive to a second directional component of magnetic flux; and wherein the first directional component is substantially orthogonal to the second directional component.

Preferably the first directional component is a vertical component of magnetic flux and the second directional component is a horizontal component of magnetic flux.

Preferably the first and second coils are wound orthogonally to each other such that one coil is most sensitive to the first directional component of magnetic flux, and the other coil is most sensitive to the second directional component of magnetic flux.

Alternatively the first coil may comprise a first pair of half-coils, and the second coil may comprise a second pair of half-coils.

Preferably the core is constructed with a flat E cross-section.

Preferably the core is constructed from a permeable ferrous material, most preferably ferrite.

Preferably each coil is independently tuned with one or more capacitors.

Preferably the apparatus includes an electrical circuit to independently rectify the current induced in each coil.

Preferably the apparatus includes an electrical circuit to sum and regulate the rectified output from the coils such that the total output power is essentially constant over a wide range of lateral movement of the apparatus relative to the source of magnetic flux.

In a further aspect the invention may broadly be said to consist in inductive power transfer pick-up apparatus including:

an E-shaped core having at least three substantially parallel legs and connection regions connecting adjacent legs to each other, the connection portions having an axis which is orthogonal to axes of the legs;

a first set of part-coils and a second set of part-coils, the first set being arranged to be sensitive to a directional component of magnetic flux substantially parallel to the axes of the legs, and the second set being arranged to be sensitive to a directional component of magnetic flux substantially parallel to the axis of the connection portions.

Preferably at least one of the part-coils of the first set and at least one of the part-coils of the second set is provided on one of the connection regions and at least one of the part-coils of each set is provided on one or more other connection portions.

Preferably one or more separate tuning capacitors are provided for each coil set.

In a further aspect the invention broadly consists in a IPT system including a pick-up as set forth in any one of the preceding statements of invention and a track having one or more primary conductors, the one or more primary conductors being capable of providing the magnetic flux.

Further aspects of the invention will become apparent form the following description.

DRAWING DESCRIPTION

A number of embodiments of the invention will now be described with reference to the drawings in which.

DETAILED DESCRIPTION OF THE DRAWINGS

Figure 1:
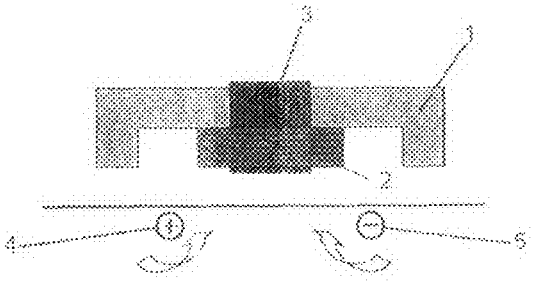
FIG. 1 is a diagrammatic cross-section of an IPT pick-up according to one embodiment of the invention.

Throughout the description like reference numerals will be used to refer to like features in different embodiments.

Referring first to FIG. 1, a pick-up geometry according to a first embodiment of the invention is shown by way of example, arranged to capture flux having a first directional component, being substantially vertical, and a second directional component, being substantially horizontal.

Those skilled in the art will appreciate that the directional components of magnetic flux will vary dependent on the orientation of the system. For ease of description, the terms vertical and horizontal are used to describe direction in relation to examples in which the primary conductors providing the magnetic flux are laid on or in a floor, and the pick-up is designed to travel over the floor, intercepting magnetic flux generated by the conductors which are energized in the known way.

The apparatus in this embodiment comprises a core 1 having an E-shaped cross-section (preferably constructed of magnetically-permeable ferrite or a material having similar desirable magnetic properties), with three substantially parallel vertical legs and orthogonal connection regions connecting adjacent legs to each other. A core of this geometry may be referred to as a Flat E Core.

The core 1 is provided with a first coil 2 wound around a vertical axis and a second coil 3 wound around a horizontal axis of the core. The pick-up is shown positioned so that the coil is situated between the two track conductors 4 and 5 with current flowing in opposing directions, producing anti-clockwise and clockwise magnetic fields, respectively. In this configuration, the current induced in the coil 2 is maximum when the coil is positioned between the two track conductors 4 and 5 (as illustrated), and drops to zero as the coil is moved directly above either of the two conductors. Conversely, the current induced in the coil 3 is maximum when the coil is positioned directly above either of the track conductors 4 or 5, and drops to zero as the coil approaches the midpoint between the two conductors. Therefore, coil 2 is most sensitive to magnetic flux in one direction (a vertical direction as shown in FIG. 1), and coil 3 is most sensitive to magnetic flux in another direction (a horizontal direction as shown in FIG. 1). Accordingly this arrangement, in which the coils are substantially orthogonal to each other, allows a pick-up to extract power over a wider range of movement relative to the track conductors, meaning it has greater tolerance to misalignment. In particular, the pick-up can extract power from the track conductors over a wider horizontal distance.

Figure 2:
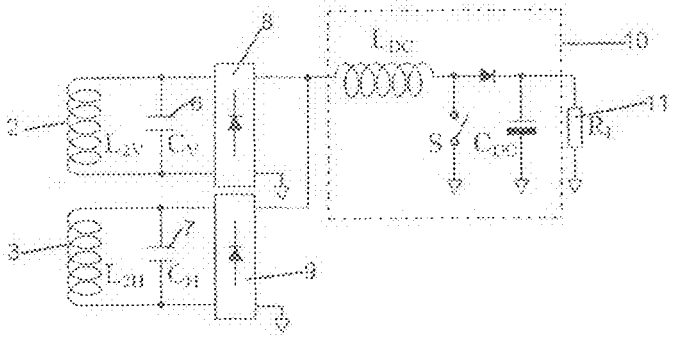
FIG. 2 is one possible tuning and power control circuit for the pick-up structure of FIG. 1.

FIG. 2 shows a possible tuning and power control circuit for the pick-up configuration of FIG. 1, including independent tuning capacitors (6 and 7) and rectifiers (8 and 9) for the coils 2 and 3, respectively, and a regulating circuit generally referenced 10 which operates in the known way, decoupling the pick-up from the primary conductors to supply a constant voltage to the load 11. This control strategy is described in greater detail in U.S. Pat. No. 5,293,308, the contents of which are incorporated herein by reference.

Series tuning capacitors may also be provided if required for each coil to ensure that the effective short circuit current and open circuit voltage outputs of both the first and second coils can be matched, thereby ensuring a power profile that is as even as possible across the width of a track.

Figure 3:
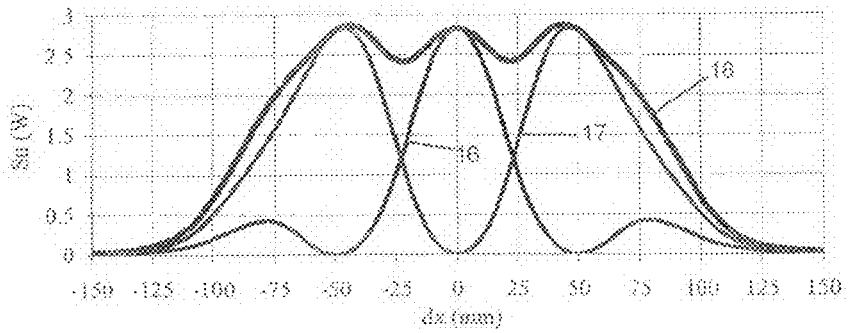
FIG. 3 is the power profile for the pick-up structure of FIG. 1.

FIG. 3 shows a typical uncompensated power profile for the circuit of FIG. 2, if used in a single phase track circuit with two wires corresponding to the arrangement shown in FIG. 1 where dx=0 mm is the centre of the track, and conductors 4 and 5 are located at dx=−50 mm and +50 mm. This figure illustrates the complimentary power profiles of the coils 2 and 3. Locus 16 shows the power profile for the vertical coil 2 and locus 17 shows the power profile for the horizontal coil 3. The total power available when tuned will be the operating quality factor of the combined circuit (Q) multiplied by the combined uncompensated power which is shown by locus 18. This shows the capability of the pick-up to extract power over a wide horizontal tolerance range (greater than 3 times that of a single pick-up with only vertical or horizontal flux capture). This circuit has been found to be remarkably effective.

Typically, track conductors for floor mounted AGVs are 100 mm apart and a misalignment of the order of 25 mm will reduce the power to a level so low as to be impractical using existing circuits. However, with a pick-up such as that shown in FIG. 1, a misalignment of more than 100 mm to either side still gives an acceptable power output. In roadway applications where the surface is likely to be uneven this tolerance is of great value and makes driver-operated vehicles a practical proposition.

Figure 4:
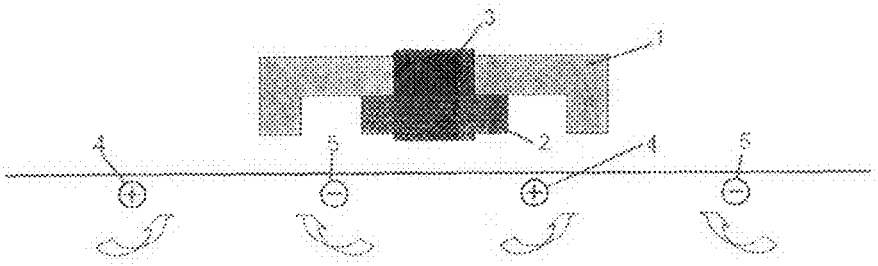
FIG. 4 is the same pick-up as that shown in FIG. 1, but positioned above two pairs of single phase tracks.

The number of conducting tracks may be increased to allow a wider range of motion of the pick-up, for example the use of two track circuits is shown in FIG. 4. By adding more track circuits the tolerance to horizontal misalignment can be as great as required for any situation. It will be seen that in the embodiments illustrated all of these track circuits operate in a single phase mode. It will be appreciated by those skilled in the art, however, that the apparatus may also be used with a multiple-phase track system.

Figure 5:
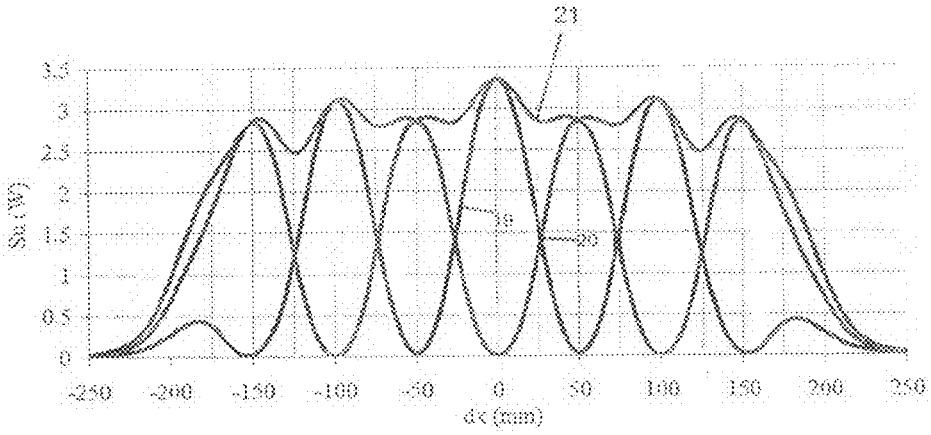
FIG. 5 is the power profile for the pick-up structure of FIG. 4.

The associated power profile for the two pairs of single phase tracks of FIG. 4 is shown in FIG. 5 in which locus 19 shows the power profile for the vertical coil 2 and locus 20 shows the power profile for the horizontal coil 3. The total power profile is shown by locus 21. Again, dx=0 mm is the centre of the track, and conductors 4 and 5 are located at dx=−100 mm, −50 mm, +50 mm and +100 mm.

Figure 6:
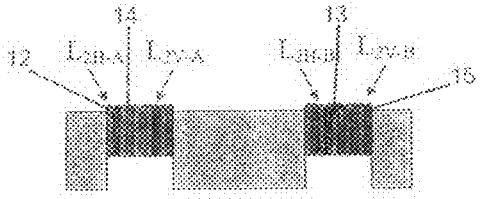
FIG. 6 is a cross-section of a second embodiment of the invention.
Figure 7:
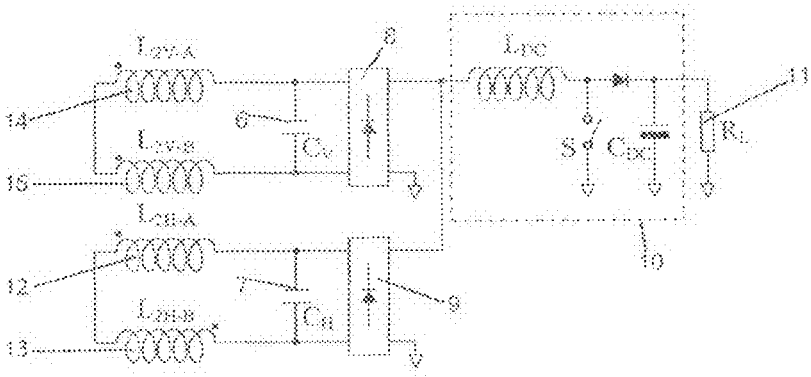
FIG. 7 is one possible tuning and power control circuit for the pick-up structure of FIG. 6.

FIG. 6 shows a second embodiment of the pick-up apparatus according to the invention, in which the two coils each comprise a set of part-coils (in this embodiment half-coils), 12 and 13, and 14 and 15. In this configuration, the vertical component of magnetic flux flows through the central leg of the E core and splits through the connection portions of the core which are provided either side of the central leg and connect the central leg to the remaining two legs of the core. As can be seen axes of the connecting portions are orthogonal to axes of the legs. As the part-coils are provided on the connection portions, coils 14 and 15 which are most sensitive to the vertical flux component need to be arranged as shown in FIG. 7 to sum the induced current which will be in a different direction in each coil. Coils 12 and 13 are most sensitive to the horizontal flux component and are arranged to sum the induced currents. The associated tuning and power control circuit for this embodiment is shown in FIG. 7.

The tuning capacitors in FIG. 7 must all be individually chosen as they all correspond to different magnetic circuits. Again this wiring arrangement gives the same form of output as indicated in FIG. 5 and can be extended indefinitely by adding extra track circuits. Also, the E core may be extended by adding additional legs and connection portions, with further part-coils. Again, series tuning capacitors can be provided for the coil sets to match the outputs of the coil sets, and thus provide a power profile that is as even as possible across the width of the track.

From the foregoing it will be seen that the pick-up apparatus increases the useful range of lateral movement while still achieving useful power outputs with little change or added cost to the electronic control circuitry. In at least one practical-IPT application, these circuits are particularly useful with simple single circuit tracks and typically increase the useful range of lateral movement from 50 mm to 150 mm while still achieving useful power outputs.

Unless the context clearly requires otherwise, throughout the description the words "comprise", "comprising", and the like, are to be construed in an inclusive sense as opposed to an exclusive or exhaustive sense, that is to say, in the sense of "including, but not limited to".

Where in the foregoing description reference has been made to specific components or integers of the invention having known equivalents, then such equivalents are herein incorporated as if individually set forth.

Although this invention has been described by way of example and with reference to possible embodiments thereof, it is to be understood that modifications or improvements may be made thereto without departing from the scope of the invention.

What we claim is:

[1. An Inductive Power Transfer (IPT) pick-up apparatus comprising:

a magnetically permeable core;

a first coil, being wound about the core so as to be inductive coupled therewith such that a current induced in the first coil is most sensitive to a first directional component of magnetic flux; and a second coil, being wound about the core so as to be inductively coupled therewith such that a current induced in the second coil is most sensitive to a second directional component of magnetic flux;

wherein the first directional component is substantially orthogonal to the second directional component.]

[2. An IPT pick-up apparatus as claimed in claim 1, wherein the first directional component is a vertical component of magnetic flux and the second directional component is a horizontal component of magnetic flux.]

[3. An IPT pick-up apparatus as claimed in claim 1, wherein the first and second coils are wound orthogonally to each other such that the current induced in one coil is most sensitive to the first directional component of magnetic flux, and the current induced in the other coil is most sensitive to the second directional component of magnetic flux.]

[4. An IPT pick-up apparatus as claimed in claim 1, wherein the first coil comprises a first pair of half-coils, and the second coil comprises a second pair of half-coils.]

[5. An IPT pick-up apparatus as claimed in claim 1, wherein the core is constructed with a flat E cross-section.]

[6. An IPT pick-up apparatus as claimed in claim 1, wherein the core is constructed from a permeable ferrous material such as ferrite.]

[7. An IPT pick-up apparatus as claimed in claim 1, wherein each coil is independently tuned with one or more capacitors.]

[8. An IPT pick-up apparatus as claimed in claim 1, wherein the apparatus comprises an electrical circuit to independently rectify the current induced in each coil.]

[9. An IPT pick-up apparatus as claimed in claim 1, wherein the apparatus comprises an electrical circuit to sum and regulate the rectified output from the coils such that the total output power is essentially constant over a wide range of lateral movement of the apparatus relative to the source of magnetic flux.]

[10. An Inductive Power Transfer (IPT) pick-up apparatus comprising:

a magnetically permeable E-shaped core having at least three substantially parallel legs and connection regions connecting adjacent legs to each other, the connection regions having an axis which is orthogonal to the axes of the legs;

a first set of part-coils and a second set of part-coils each wound about the core so as to be inductively coupled therewith, the first set being arranged such that the current induced therein is most sensitive to a directional component of magnetic flux substantially parallel to the axes of the legs, and the second set being arranged to be sensitive to a directional component of magnetic flux substantially parallel to the axis of the connection portions.]

[11. An IPT pick-up apparatus as claimed in claim 10, wherein at least one of the part-coils of the first set and at least one of the part-coils of the second set is provided on one of the connection regions and at least one of the part-coils of each set is provided on one or more other connection regions.]

[12. An IPT pick-up apparatus as claimed in claim 10, wherein one or more separate tuning capacitors are provided for each coil set.]

[13. An Inductive Power Transfer (IPT) pick-up apparatus comprising:

a magnetically permeable core;

a first coil, being wound about the core so as to be inductive coupled therewith such that a current induced in the first coil is most sensitive to a first directional component of magnetic flux;

a second coil, being wound about the core so as to be inductively coupled therewith such that a current induced in the second coil is most sensitive to a second directional component of magnetic flux; and a track having one or more primary conductors, the one or more primary conductors being capable of providing the magnetic flux;

wherein the first directional component is substantially orthogonal to the second directional component.]

[14. An Inductive Power Transfer (IPT) pick-up apparatus comprising:

a magnetically permeable E-shaped core having at least three substantially parallel legs and connection regions connecting adjacent legs to each other, the connection regions having an axis which is orthogonal to the axes of the legs;

a first set of part-coils and a second set of part-coils each wound about the core so as to be inductively coupled therewith, the first set being arranged such that the current induced therein is most sensitive to a directional component of magnetic flux substantially parallel to the axes of the legs, and the second set being arranged to be sensitive to a directional component of magnetic flux substantially parallel to the axis of the connection portions; and a track having one or more primary conductors, the one or more primary conductors being capable of providing the magnetic flux.]

*15. A pick-up apparatus comprising:*

*a magnetically permeable core arranged to capture magnetic flux from a source of magnetic flux having vertical and horizontal directional components;*

*a first tuned coil being inductively coupled to the magnetically permeable core such that a current induced in the first tuned coil is most sensitive to the vertical directional component of magnetic flux;*

*a second tuned coil being inductively coupled to the magnetically permeable core such that a current induced in the second tuned coil is most sensitive to the horizontal directional component of magnetic flux; and*

*an electrical circuit configured to sum and regulate a rectified electrical output from the first and second tuned coils to provide a total power output that is substantially constant over a wide range of lateral movement of the apparatus relative to a source of magnetic flux,*

*wherein at least one of the first tuned coil or the second tuned coil overlaps the other of the first tuned coil or the second tuned coil, and a geometric center of the first tuned coil is substantially offset from a geometric center of the second tuned coil.*

*16. The pick-up apparatus of claim 15, wherein the first and second tuned coils are each independently connected to one or more tuned capacitors.*

*17. The pick-up apparatus of claim 15, wherein the electrical circuit is configured to independently rectify the current induced in each of the first and second tuned coils.*

*18. The pick-up apparatus as claimed in claim 15, wherein the first and second tuned coils are connected in parallel to one or more tuning capacitors.*

*19. The pick-up apparatus as claimed in claim 15, wherein the electrical circuit provides a total power output that is substantially constant over a wide range of lateral movement of the apparatus without requiring a battery.*

*20. The pick-up apparatus as claimed in claim 15, wherein the pick-up apparatus is configured to match an effective short circuit current between each of the tuned coils, and to match an effective open circuit voltage between each of the tuned coils.*

*21. The pick-up apparatus of claim 15, wherein the core is established by three substantially parallel vertical legs and orthogonal connection regions connecting adjacent legs to each other.*

*22. The pick-up apparatus of claim 15, wherein the first tuned coil and the second tuned coil are wound about a leg of the core that extends in a direction that is parallel to the vertical directional component, the core having portions extending normal to the vertical direction component on two opposite sides of the leg.*

*23. The pick-up apparatus of claim 15, wherein the magnetically permeable core has a height that is less than half the width, wherein the height is measured in a direction parallel to a vector from the source of the magnetic flux to the core when the core is over the source, and the width is normal to the height.*

*24. A pick-up apparatus comprising:*

*a magnetically permeable core arranged to capture magnetic flux from a source of magnetic flux having vertical and horizontal directional components;*

*a first tuned coil being inductively coupled to the magnetically permeable core such that a current induced in the first tuned coil is most sensitive to the vertical directional component of magnetic flux;*

*a second tuned coil being inductively coupled to the magnetically permeable core such that a current induced in the second tuned coil is most sensitive to the horizontal directional component of magnetic flux; and*

*an electrical circuit configured to sum and regulate a rectified electrical output from the first and second tuned coils to provide a total power output that is substantially constant over a wide range of lateral movement of the apparatus relative to a source of magnetic flux,*

*wherein an axis of winding of the first tuned coil is at least generally parallel with an axis of winding of the second tuned coil.*

*25. The pick-up apparatus of claim 24, wherein the core is constructed with an E cross-section.*

*26. The pick-up apparatus of claim 24, wherein the first and second tuned coils are each independently connected to one or more tuned capacitors.*

*27. The pick-up apparatus of claim 24, wherein the electrical circuit is configured to independently rectify the current induced in each of the first and second tuned coils.*

*28. The pick-up apparatus as claimed in claim 24, wherein the first and second tuned coils are connected in parallel to one or more tuning capacitors.*

*29. The pick-up apparatus as claimed in claim 24, wherein the electrical circuit provides a total power output that is substantially constant over a wide range of lateral movement of the apparatus without requiring a battery.*

*30. The pick-up apparatus as claimed in claim 24, wherein the pick-up apparatus is configured to match an effective short circuit current between each of the tuned coils, and to match an effective open circuit voltage between each of the tuned coils.*

*31. The pick-up apparatus of claim 24, wherein the core is established by three substantially parallel vertical legs and orthogonal connection regions connecting adjacent legs to each other.*

*32. The pick-up apparatus of claim 24, wherein the magnetically permeable core has a height that is less than half the width, wherein the height is measured in a direction parallel to a vector from the source of the magnetic flux to the core when the core is over the source, and the width is normal to the height.*

*33. A pick-up apparatus comprising:*

*a magnetically permeable core arranged to capture magnetic flux from a source of magnetic flux having vertical and horizontal directional components;*

*a first tuned coil being inductively coupled to the magnetically permeable core such that a current induced in the first tuned coil is most sensitive to the vertical directional component of magnetic flux;*

*a second tuned coil being inductively coupled to the magnetically permeable core such that a current induced in the second tuned coil is most sensitive to the horizontal directional component of magnetic flux; and*

*an electrical circuit configured to sum and regulate a rectified electrical output from the first and second tuned coils to provide a total power output that is substantially constant over a wide range of lateral movement of the apparatus relative to a source of magnetic flux,*

*wherein the core is established by three substantially parallel vertical legs and orthogonal connection regions connecting adjacent legs to each other.*

*34. The pick-up apparatus of claim 33, wherein the first and second tuned coils are each independently connected to one or more tuned capacitors.*

*35. The pick-up apparatus of claim 33, wherein the electrical circuit is configured to independently rectify the current induced in each of the first and second tuned coils.*

*36. The pick-up apparatus as claimed in claim 33, wherein the first and second tuned coils are connected in parallel to one or more tuning capacitors.*

*37. The pick-up apparatus as claimed in claim 33, wherein the electrical circuit provides a total power output that is substantially constant over a wide range of lateral movement of the apparatus without requiring a battery.*

*38. The pick-up apparatus as claimed in claim 33, wherein the pick-up apparatus is configured to match an effective short circuit current between each of the tuned coils, and to match an effective open circuit voltage between each of the tuned coils.*

*39. The pick-up apparatus of claim 33, wherein an axis of winding of the first tuned coil is at least generally parallel with an axis of winding of the second tuned coil.*

*40. The pick-up apparatus of claim 33, wherein the first tuned coil and the second tuned coil are wound about a leg of the core that extends in a direction that is parallel to the vertical directional component, the core having portions extending normal to the vertical direction component on two opposite sides of the leg.*

*41. The pick-up apparatus of claim 33, wherein the magnetically permeable core has a height that is less than half the width, wherein the height is measured in a direction parallel to a vector from the source of the magnetic flux to the core when the core is over the source, and the width is normal to the height.*

* * * * *